(12) United States Patent
Uemoto et al.

(10) Patent No.: US 7,080,929 B2
(45) Date of Patent: Jul. 25, 2006

(54) LAMP UNIT IN MOTORCYCLE

(75) Inventors: Takumi Uemoto, Kobe (JP); Ryota Obuki, Kobe (JP)

(73) Assignee: Kawasaki Jukogyo Kabushika Kaisha, Hyogo (JP)

( * ) Notice: Subject to any disclaimer, the term of this patent is extended or adjusted under 35 U.S.C. 154(b) by 0 days.

(21) Appl. No.: 10/901,876

(22) Filed: Jul. 29, 2004

(65) Prior Publication Data

US 2006/0023462 A1    Feb. 2, 2006

(51) Int. Cl.
*B62J 6/00* (2006.01)
*F21V 33/00* (2006.01)

(52) U.S. Cl. .............. 362/475; 362/518; 362/243; 362/245; 362/297; 362/346

(58) Field of Classification Search ............. 362/475, 362/476, 516, 517, 518, 243, 245, 249, 297, 362/299, 346, 473, 544
See application file for complete search history.

(56) References Cited

U.S. PATENT DOCUMENTS

| 4,686,656 A * | 8/1987 | Morishima ............. 362/473 |
| 6,439,753 B1 * | 8/2002 | Sumada et al. ......... 362/475 |
| 6,921,187 B1 * | 7/2005 | Mochizuki et al. ...... 362/514 |
| 2004/0264204 A1 * | 12/2004 | Toyofuku ............... 362/473 |

* cited by examiner

*Primary Examiner*—Sandra O'Shea
*Assistant Examiner*—Sharon Payne

(57) ABSTRACT

A lamp unit (23) mounted above a front fender (7) for a wheel (6) of a motorcycle includes left and right head lamps (23*a*, 23*b*), a single lens member (23*d*) positioned forwardly of and covering the head lamps (23*a*, 23*b*), and a mirror finished body (29) positioned rearwardly of the lens member (23*d*). The mirror finished body (29) includes a first mirror surface area (29*a*) aligned with an intermediate portion of the lens member (23*d*) extending vertically, and left and right second mirror surface areas (29*b*) continued from the first mirror surface area (29*a*) extending horizontally along a lower edge of the lens member (23*d*). The mirror finished body (29) is formed to reflect an image of the fender (7) when viewed either from front or slantwise from front.

11 Claims, 9 Drawing Sheets

FORWARD

LAMP UNIT IN MOTORCYCLE

BACKGROUND OF THE INVENTION

1. Field of the Invention

The present invention generally relates to a lamp unit adapted to be disposed above a front fender for overhanging a motorcycle front wheel and, more particularly, to the lamp unit of a design in which a lens member covering at least head lamps can provide varying, but appealing designs one at a time when viewed from front or slantwise from front, depending on the direction of travel of imagewise rays of light reflected from the fender.

2. Description of the Prior Art

As is well known to those skilled in the art, most of the conventional motorcycles have a front fairing or cowling mounted on a front portion thereof. A lamp unit is mounted in the front fairing. The lamp unit encases therein at least one head lamp for illuminating forwardly of the motorcycle and at least one position lamp adapted to be lit during the dusk or parking to provide an indication of the motorcycle to the oncoming vehicles, and is available in two types; a single lamp design having a single lens member disposed at a position intermediate of the width of the motorcycle, and a dual lamp design having left and right lens members one for each of left and right head lamps. The single lamp design and the dual lamp design have their own unique appearances and can therefore provide different impressions.

SUMMARY OF THE INVENTION

The present invention is intended to provide a lamp unit of a design in which, when the lamp unit is viewed from different directions, the shape of the lens member can be perceived as delicately varying as if it were to have different appearances.

Another important object of the present invention is to provide a motorcycle utilizing the lamp unit of the type referred to above.

In order to accomplish these objects, the present invention in one aspect thereof provides a lamp unit adapted to be mounted above a front fender for a front wheel of a Motorcycle, which includes left and right head lamps, a single lens member positioned forwardly of and covering the left and right head lamps, and a mirror finished body positioned rearwardly of the lens member and including a first mirror surface area aligned with an intermediate portion of the lens member so as to extend up and down and left and right second mirror surface areas continued from the first mirror surface area so as to extend in respective directions away from each other beneath the associated head lamps and along a lower edge of the lens member. The first mirror surface area, when viewed from front, is operable to reflect an image of the front fender imagewise cast thereupon and, on the other hand, each of the second mirror surface areas, when viewed slantwise from front, is operable to reflect an image of the front fender imagewise cast thereupon.

According to this aspect of the present invention, when the lamp unit is viewed from front, imagewise rays of light carrying an image of the fender is cast on the first mirror surface area that is aligned with the intermediate portion of the lens member so as to extend up and down. Accordingly, when the lamp unit is viewed from front, the single lens member covering forwardly of the left and right head lamps can be looked as if of, so called, a dual lamp design having left and right lens members on respective sides of the lamp unit. However, when the lamp unit is viewed slantwise from front, no imagewise ray of light carrying the image of the fender is cast on that intermediate portion of the first mirror surface area and, therefore, the lamp unit can be looked as if of a single lamp design.

Also, since the imagewise rays of light carrying the image of the fender are cast on the second mirror surface areas deployed along the lower edge of the lens member, they can give a silhouette of the lower edge of the lens member to provide a different appearance of the lamp unit and its surroundings.

The first and second mirror surface areas referred to above are preferably formed integrally with each other so that an undesirable increase of the number of component parts used to form the lamp unit can advantageously be suppressed to thereby simplify the structure and reduce the cost of making the lamp unit.

In one embodiment, the first and second mirror surface areas are integrally formed with an extension utilized to make up an area inwardly of the lens member or the lamp unit interia. Concurrent use of the extension as the first and second mirror surface areas can eliminate the need to use a dedicated mirror member and, therefore, an undesirable increase of the number of component parts used to form the lamp unit can advantageously be suppressed to thereby simplify the structure and reduce the cost of making the lamp unit.

The lamp unit of the present invention may additionally include left and right position lamps positioned at respective locations laterally inwardly between the head lamps and a casing formed integrally with the extension for accommodating the position lamps therein. This structural feature is effective to eliminate the need to use a casing solely dedicated to accommodate the position lamps and, accordingly, the number of component parts used to form the lamp unit can advantageously be reduced, resulting in simplification in structure and reduction in manufacturing cost.

The present invention in another aspect thereof also provides an improvement of a lamp unit in a motorcycle including a front wheel, a front fender mounted on a front portion of the motorcycle so as to overhang the front wheel, a fairing mounted on the motorcycle for covering the front portion thereof and having an opening defined therein, said front fender and fairing being colored in a common color, and the lamp unit. The lamp unit is the one according to the first aspect of the invention disposed above the front fender and exposed to outside through the opening in the fairing.

According to this aspect of the present invention, when the lamp unit is viewed from front, imagewise rays of light carrying an image of the fender is cast on the first mirror surface area that is aligned with the intermediate portion of the lens member so as to extend up and down. Considering that the fairing and the fender are in the same color, the single lens member covering forwardly of the left and right head lamps can be looked as if it were physically divided by a portion of the fairing into two lens members one for each of the left and right head lamps. Accordingly, the lamp unit can be looked as if of a dual lamp design made up of the left and right lens members.

However, when the lamp unit is viewed slantwise from front, no imagewise ray of light carrying the image of the fender is cast on that intermediate portion of the lens member and, therefore, the lamp unit can be looked as if of a single lamp design. On the other hand, the imagewise rays of light carrying the image of the fender are cast on the second mirror surface areas. At this time, since the image of the fender so cast on the second mirror surface area represents the same color as that of the fairing, the second mirror surface area deployed along the lower edge of the lens member can, when the lamp unit is viewed slantwise from front, be viewed in the same color as that of the fairing, giving a silhouette of the lower edge of the lens member to thereby provide an impression as if a portion of the fairing exists below the lamp unit. Accordingly, the appearance of the lamp unit and its surroundings can be different from that when viewed from the front.

The fairing may have a peripheral edge defining the opening. In such case, the peripheral edge preferably has an upper intermediate edge portion protruding downwardly to a position near to an upper end of the first mirror surface area of the lamp unit. Positioning of the upper intermediate edge portion of the peripheral edge defining the opening in the fairing at the position near to the first mirror surface area that is aligned with the intermediate portion of the lens member so as to extend up and down allows the first mirror surface area and the fairing to represent the same color when the imagewise rays of light carrying the image of the fender is cast on the first mirror surface area. Accordingly, the single lens member covering the left and right head lamps can be looked as if physically and clearly divided at the intermediate portion of the lens member by a portion of the fairing, resulting in appearance of the dual lamp design having left and right lens segments.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Reference will now be made to the accompanying drawings for the detailed description of a preferred embodiment of the present invention.

Figure 1:
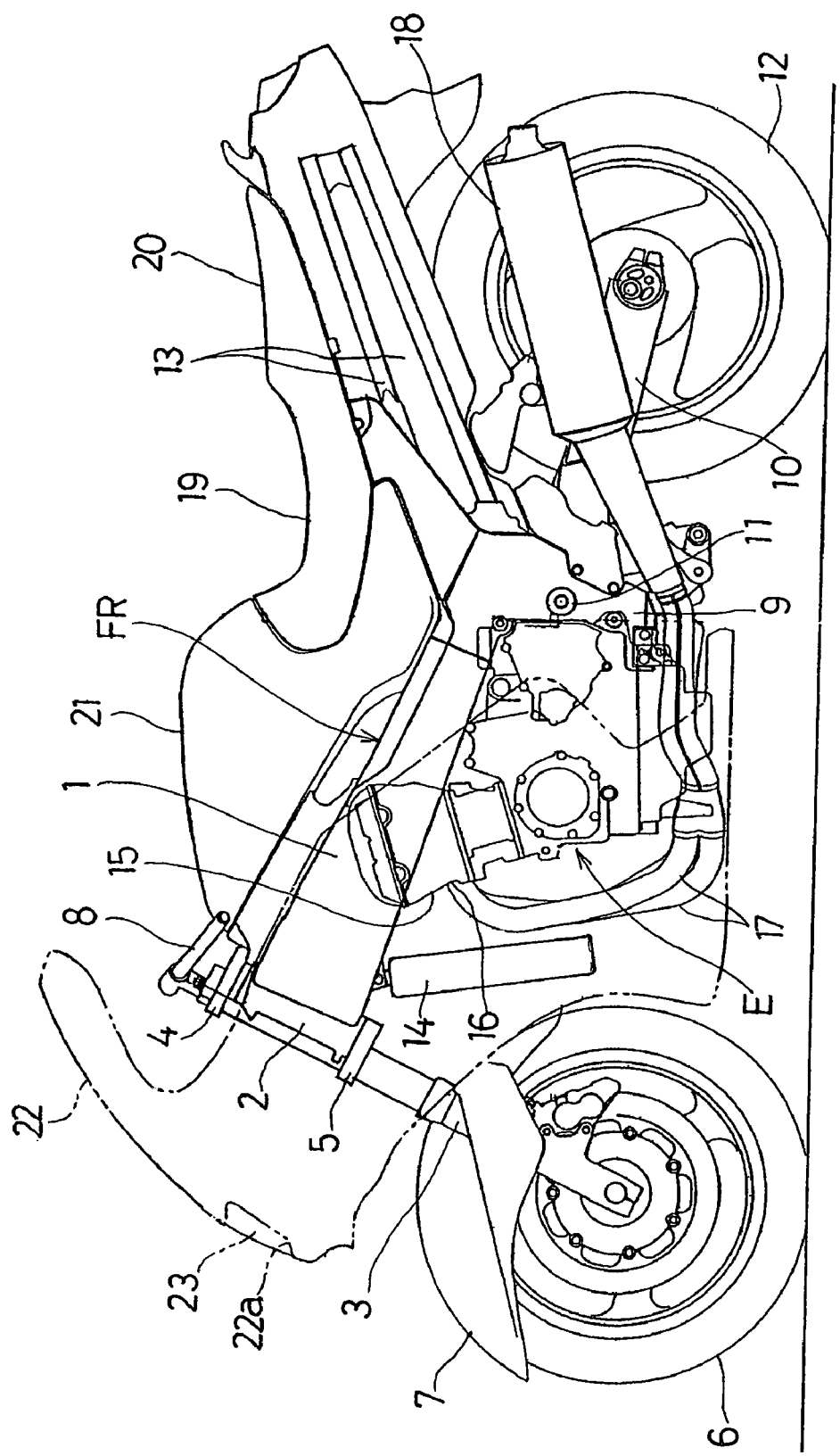
FIG. 1 is a schematic side view of a motorcycle utilizing a lamp unit according to a preferred embodiment of the present invention.

The motorcycle shown in FIG. 1 includes a main frame 1 forming a front region of the motorcycle frame structure FR, a head pipe 2 mounted on a front portion of the main frame 1, and a front fork 3 swingably supported by the head pipe 2 by means of upper and lower brackets 4 and 5. A front wheel 6 is rotatably supported by the front fork 3 in any known manner. A front fender or mudguard 7 is also supported by the front fork 3 so as to overhang the front wheel 6.

A handlebar 8 is mounted on the upper bracket 4 on an upper end of the front fork 3. The main frame 1 has a pair of left and right rear lower end portions and a pair of swing arm brackets 9 are formed at respective rear lower end portions of the main frame 1. A swing arm 10 including left and right legs is pivotally connected at a front end thereof with the swing arm brackets 9 by means of a pivot pin 11 for movement up and down about the pivot pin 11. A rear wheel 12 is rotatably supported by and between respective rear ends of the legs of the swing arm 10.

A seat rail 13 that defines a rear region of the motorcycle frame structure FR is connected rigidly with a rear portion of the main frame 1. An internal combustion engine E is mounted on a lower intermediate portion of the main frame 1 and a radiator 14 is disposed forwardly of the engine E and rearwardly of the front fender 7. Exhaust tubes 17 are fluidly connected with associated exhaust ports 16 formed in a cylinder head 15 of the engine E so that exhaust gases can be emitted to the atmosphere through the exhaust tubes 17 by way of a silencer 18.

A dual seat is mounted on the seat rail 13, which includes a front rider's seat 19 and a rear passenger's seat 20. A fuel tank 21 is mounted on a top region of the main frame 1 at a location between the rider's seat 19 and the handlebar 8. Also, as shown by the double-dotted line in FIG. 1, a front fairing 22 made of a synthetic resin is mounted on that front portion of the main frame 1 so as to cover a front region of the motorcycle including the front portion of the main frame 1, left and right sides of the engine E and lower area below the engine E. This front fairing 22 is colored the same color as that of the front fender 7, for example, lime green. A nose portion of the front fairing 22 immediately above the front fender 7 has a lamp opening 22a defined therein, and a lamp unit 23 mounted on the front fairing 22 in a manner as will be described in detail later is exposed through the lamp opening 22a to the outside so that front surfaces of the lamp unit 23 and the front fairing 22 cooperate to form a convex smooth face.

Figure 2:
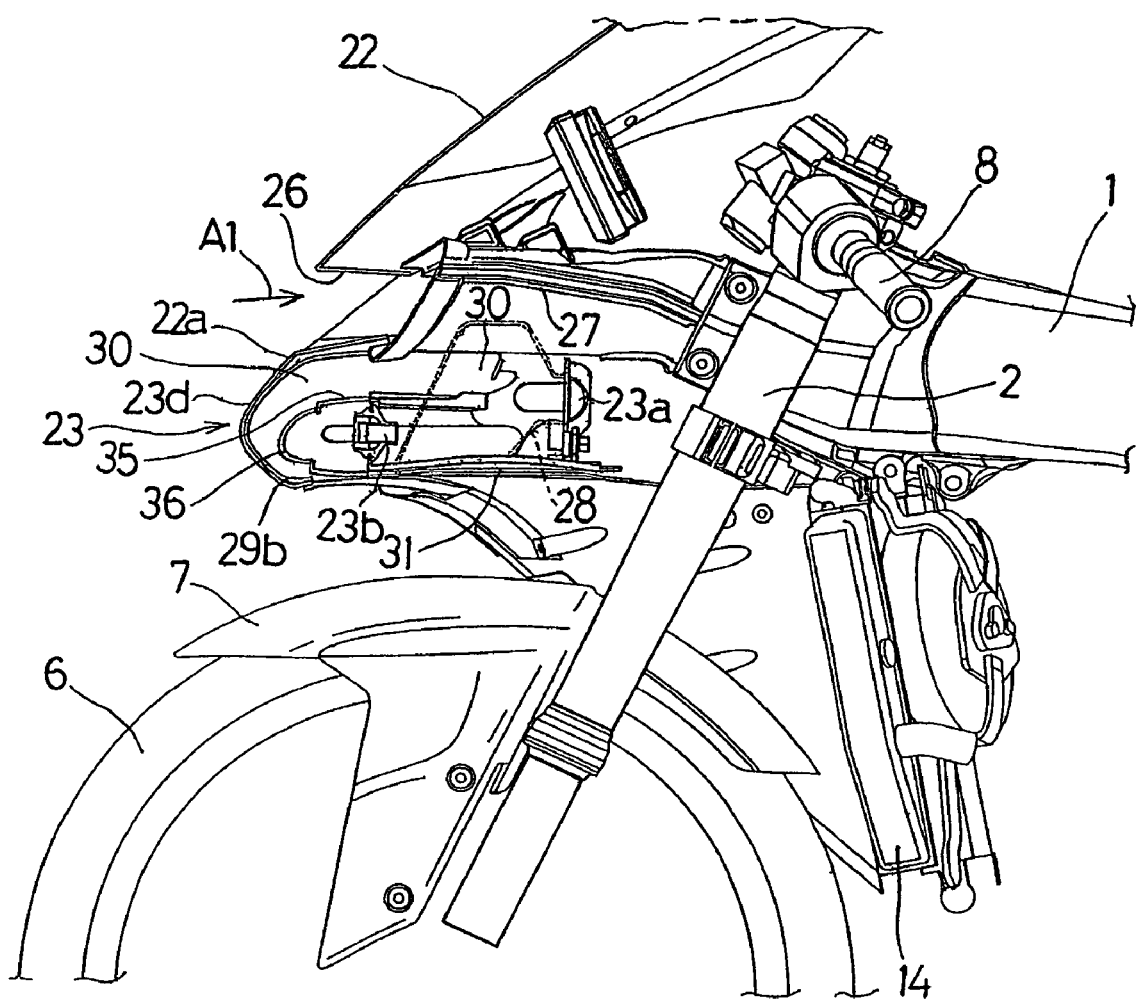
FIG. 2 is a side view, on an enlarged scale and with a portion shown in section, of a front portion of the motorcycle shown in FIG. 1.

Referring to FIG. 2, the lamp unit 23 disposed within the fairing 22 so as to confront the lamp opening 22a accommodates therein left and right head lamps 23a and left and right position lamps 23b. Each lamp is in the form of, for example, light bulb. Specifically, the position lamps 23b are positioned at a location laterally inwardly of the head lamps 23a and on respective sides of a position intermediate of the width of the front fairing 22 as viewed in FIG. 3. As best shown in FIG. 2, a common lens member 23d is positioned forwardly of the head and position lamps 23a and 23b so as to cover a region forwardly of and below the head and position lamps 23a and 23b.

A portion of the front fairing 22 above the lamp unit 23 is formed with an air intake opening 26 so that an air entering the air intake opening 26 can be introduced as a combustion air into the engine E (FIG. 1) through an air intake duct 27 supported by the main frame 1.

Figure 4:
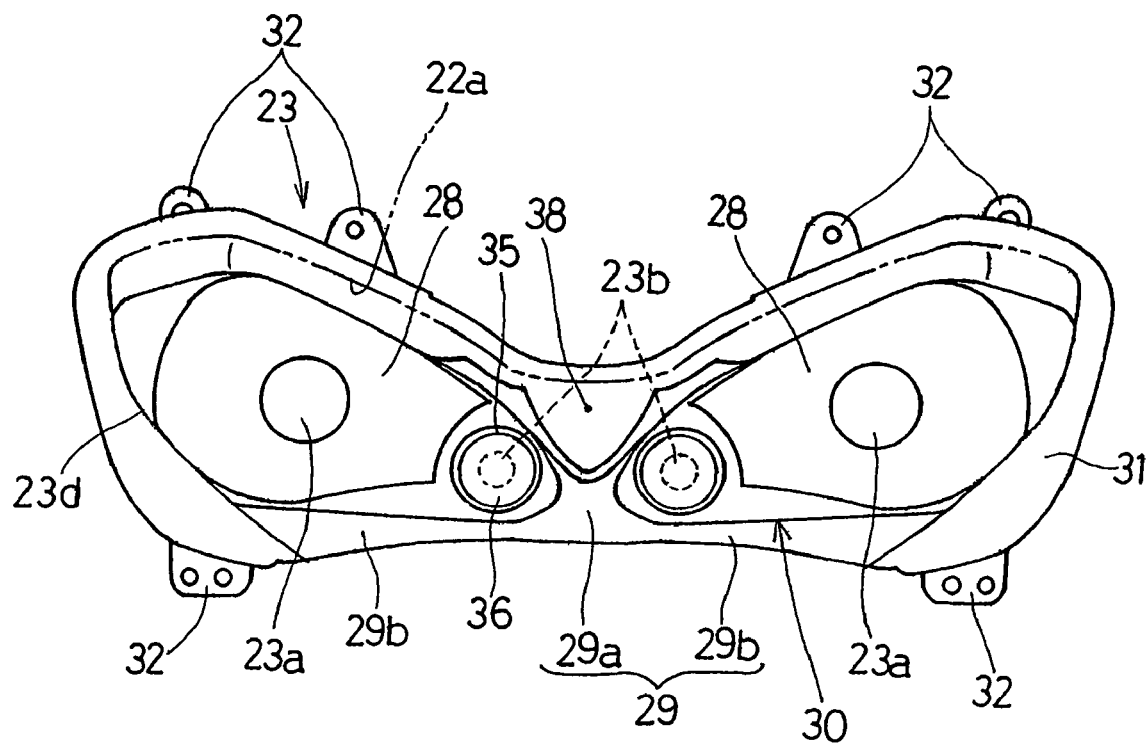
FIG. 4 is a front elevational view showing the lamp unit used in the motorcycle.

FIG. 4 illustrates the lamp unit 23. As shown therein, the lamp unit 23 includes a reflector 28 positioned rearwardly of each of the head lamps 23a for reflecting rays of light, emitted from the respective head lamp 23a, in a direction forwardly of the respective head lamp 23a. A mirror-finished body 29 is positioned rearwardly of and adjacent to the lens member 23d covering forwardly of the head lamps 23a. This mirror finished body 29 is formed integrally with and, hence, forms a part of an ornamental extension 30 covering accessories peripheral to the head and position lamps 23a and 23b to thereby make up an area inwardly (rearwardly) of the lens member 23d.

Figure 5:
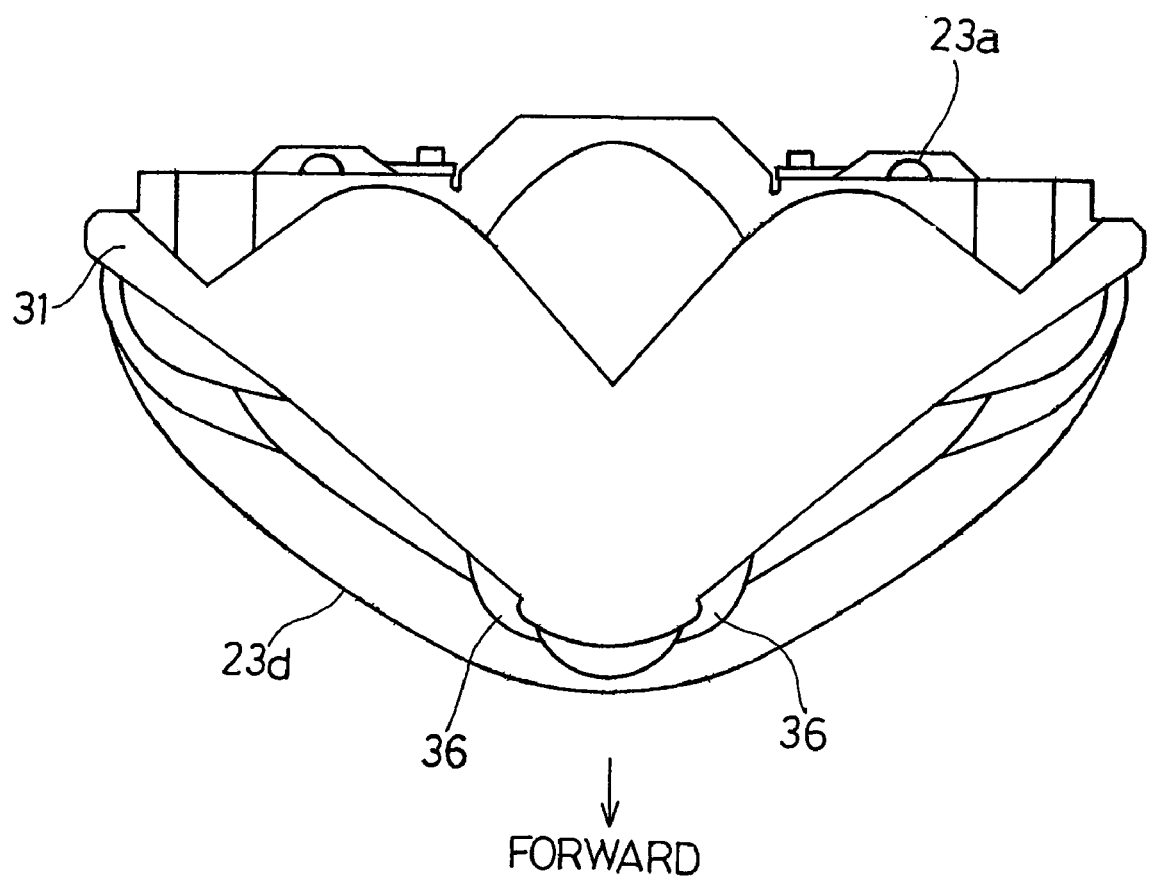
FIG. 5 is a top plan view of the lamp unit shown in FIG. 4.

The head lamps 23a, the position lamps 23b, the reflectors 28 and the extension 30 are all accommodated within a lamp body 31, and a front opening of the lamp body 31 is covered by the lens member 23d. The lamp body 31 has a plurality of flanges 32 formed integrally with a peripheral portion thereof so as to protrude outwardly therefrom, so that the lamp unit 23 can be supported by the front fairing 22 with the flanges 32 connected by means of fastening elements with a corresponding number of mounts formed in an inner surface of the front fairing 22 shown in FIG. 3. As shown in the top plan view in FIG. 5, the lamp unit 23 represents a streamlined shape with an intermediate portion of the lens member 23d protruding forwardly.

As shown in FIG. 4, the mirror finished body 29 includes a first mirror surface area 29a aligned with an intermediate portion of the lens member 23d so as to extend up and down, i.e., vertically, and left and right second mirror surface areas 29b continued from the first mirror surface area 29a so as to extend in respective directions away from each other beneath the associated head lamps 23a and along a lower edge of the lens member 23d. The mirror finished body 29 including the first and second mirror surface areas 29a and 29b is of one-pierce construction with the extension 30 thereby to suppress an undesirable increase of the number of component parts used to form the lamp unit 23 and also to reduce the cost of manufacture of the lamp unit 23.

It is to be noted that the extension 30 may be divided into a plurality of segments and each segment is formed with the associated mirror surface area 29a or 29b. It is also to be noted that one or both of the first and second mirror surface areas 29a and 29b may be formed separately from the extension 30.

Figure 6:
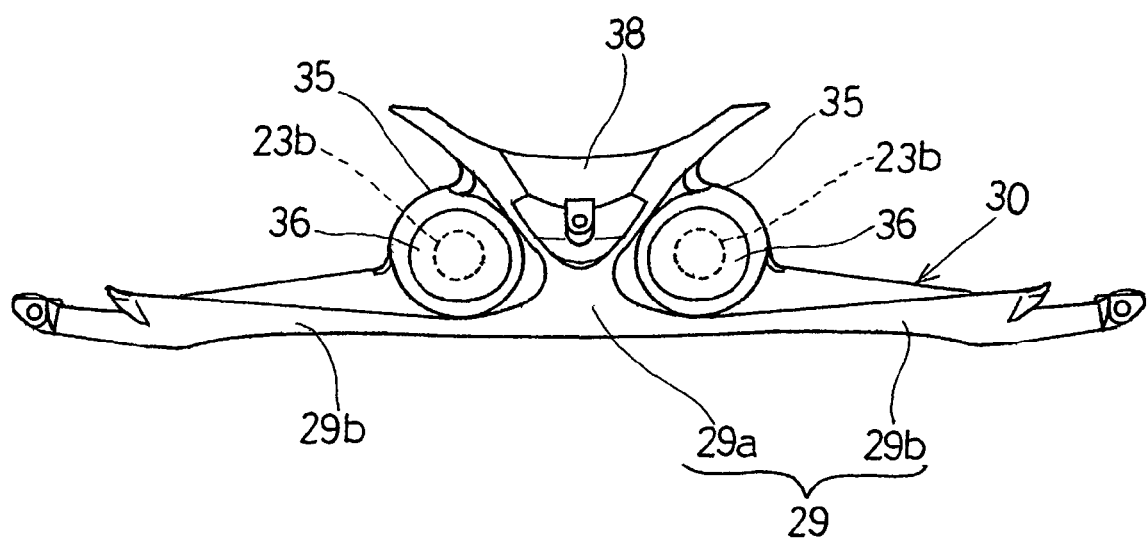
FIG. 6 is a front elevational view showing an extension and a position lamp both employed in the lamp unit.
Figure 7:
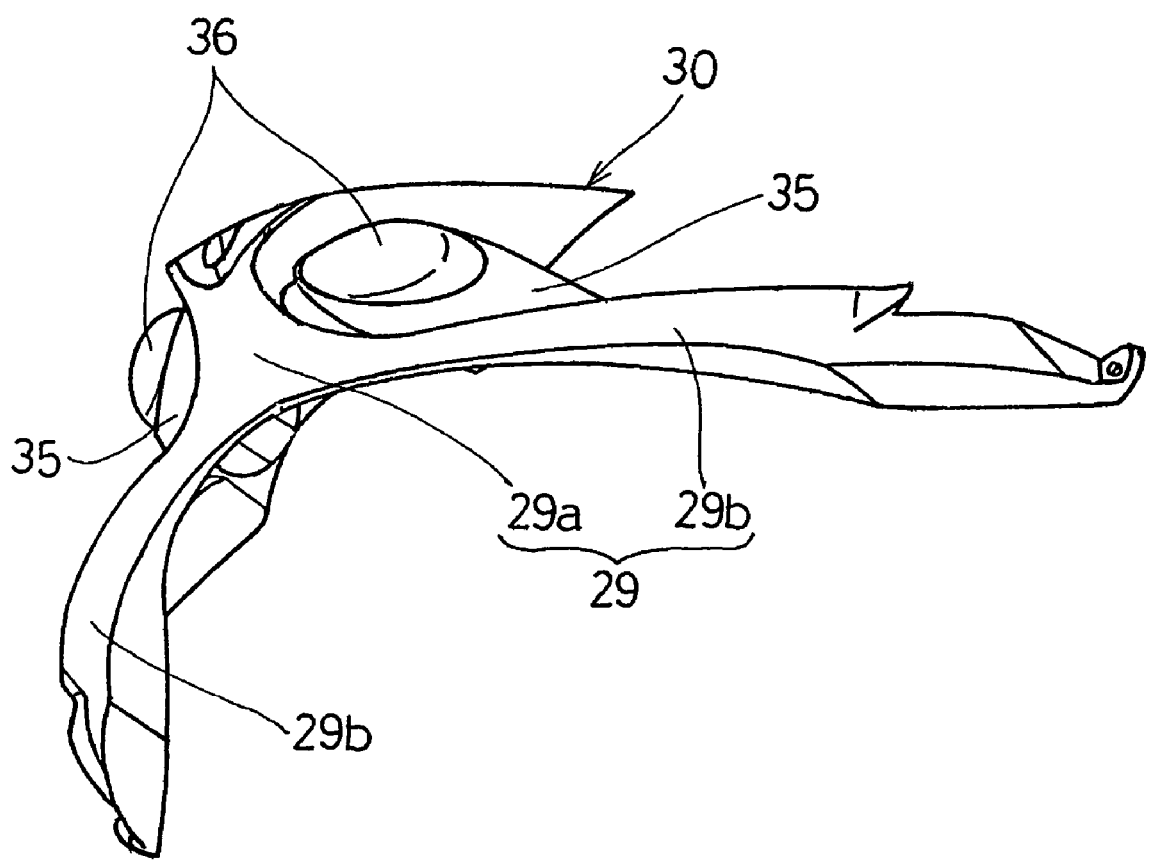
FIG. 7 is a perspective view of the extension shown in FIG. 6 as viewed from below.

As shown in a front elevational view in FIG. 6, the extension 30 includes, in addition to the mirror finished body 29 made up of the first and second mirror surface areas 29a and 29b, a casing 35 for accommodating the position lamps 23b therein. The casing 35 is formed integrally with the extension 30 and has left and right front openings which are opened forwardly and are covered by respective coverings 36 as shown in FIG. 7.

Figure 3:
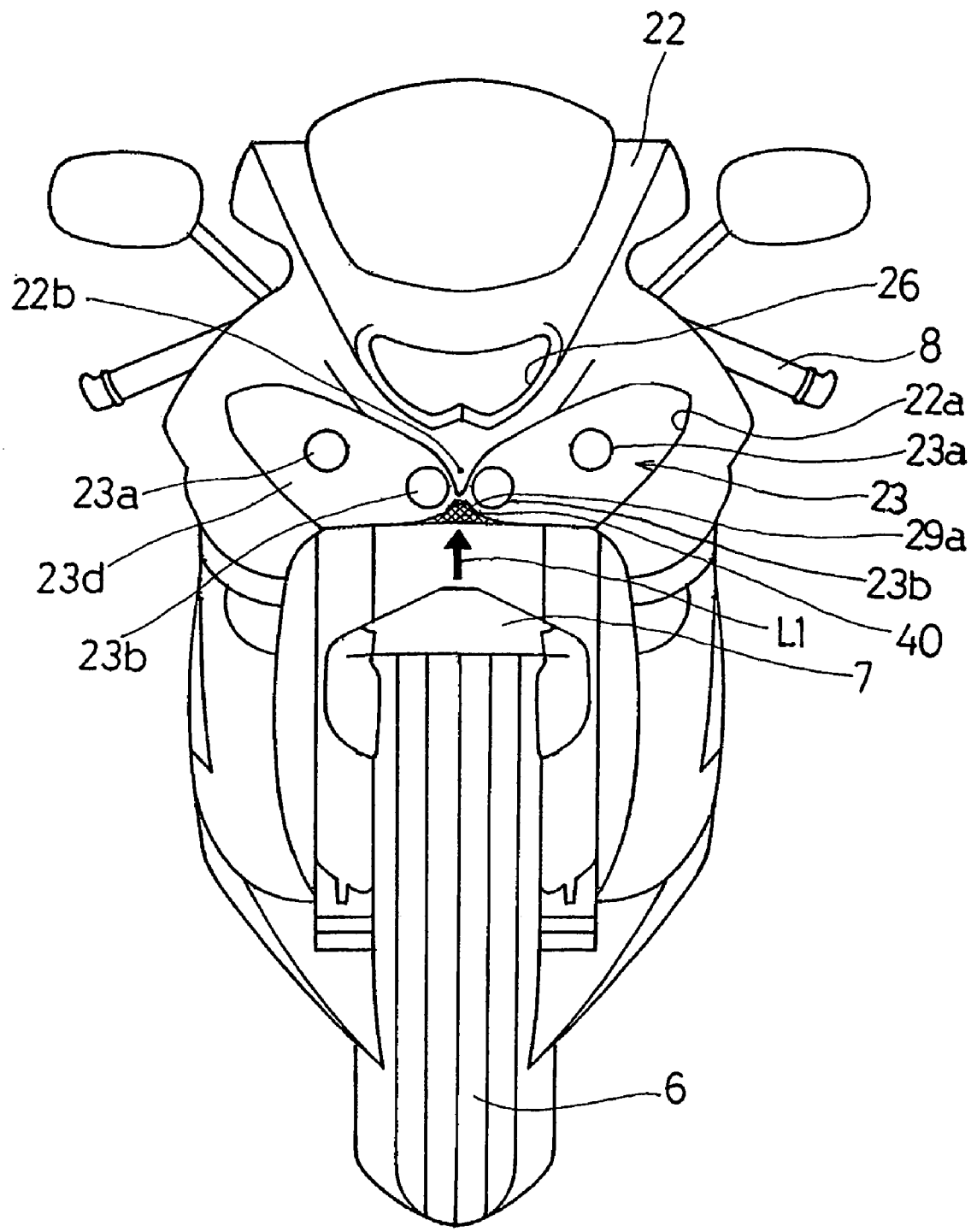
FIG. 3 is a front elevational view of the motorcycle shown in FIG. 1.
Figure 8:
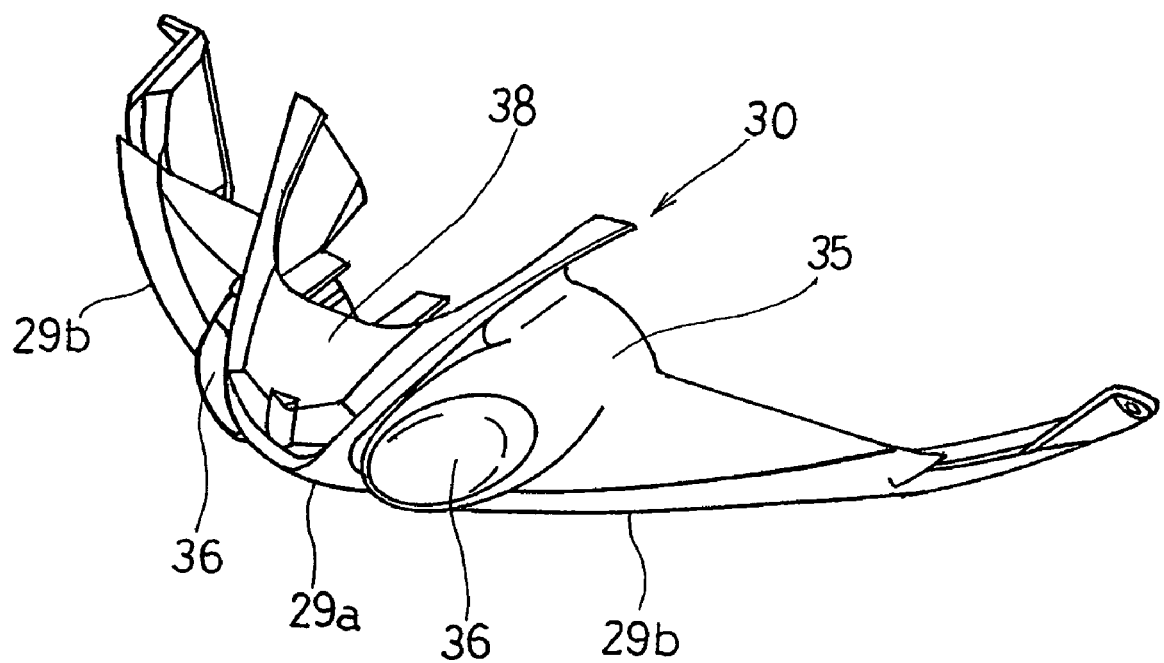
FIG. 8 is a perspective view of the extension shown in FIG. 6 as viewed from top.

Referring to FIG. 3, a peripheral edge defining the lamp opening 22a of the fairing 22 has an upper intermediate edge portion 22b so designed and so shaped as to protrude downwardly to a position near to an upper end of the first mirror surface area 29a to thereby cover a head portion 38 of the extension 30 above the first mirror surface area 29a as shown in FIGS. 6 and 8.

With the lamp unit 23 so constructed as hereinbefore described, when the motorcycle equipped with the lamp unit 23 of the embodiment of the present invention is viewed from front as shown in FIG. 3, imagewise rays of light L1 carrying an image of a portion of the front fender 7 are projected onto the first mirror surface area 29a, which is aligned with an intermediate portion of the lens member 23d of the lamp unit 23 so as to extend up and down, i.e., vertically, as shown by a cross-hatched reflected area 40 in FIG. 3. At this time, the reflected area 40 represents the same color as that of the front fender 7.

Considering that the fairing 22 and the front fender 7 are of the same color as hereinbefore described, the reflected area 40 can be perceived as if it were a portion of the fairing 22. This in turn leads to such an impression as if the lens member 23 were separated into (or made up of) left and right lenses disposed on respective sides with respect to that intermediate portion of the fairing 22, that is, the reflected area 40. In other words, the lamp unit 23 can provide the impression as if it were of a dual lamp design.

Thus, since, as hereinbefore described, the upper intermediate edge portion 22b of the peripheral edge of the lamp opening 22a defined in the fairing 22 is so designed and so shaped as to protrude downwardly to a position near to the upper end of the first mirror surface area 29a, the reflected area 40 presenting the image of that portion of the front fender 7 and the upper intermediate edge portion 22b of the same color as that represented in the reflected area 40 appear as if they were in continuity with each other in a vertical direction, the lamp unit 23 of the present invention can provide an appealing appearance.

On the other hand, when the lamp unit 23 is viewed slantwise from front of the motorcycle, no image of that portion of the front fender 7 is cast onto the intermediate portion of the lens member 23d and, accordingly, the lamp unit 23 can provide the impression as if it were of a single lamp design.

Figure 9:
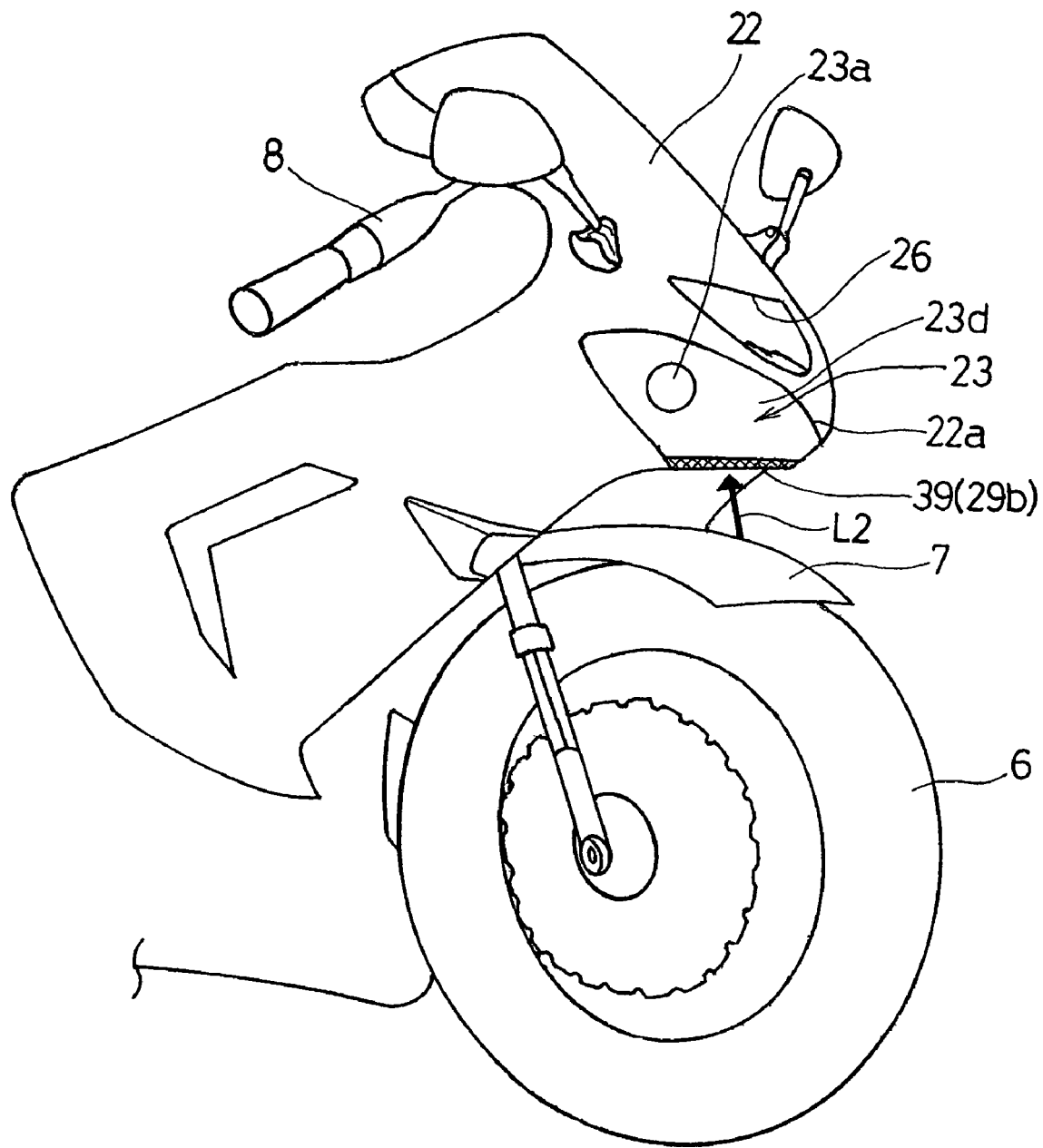
FIG. 9 is a fragmentary perspective view of the front portion of the motorcycle shown in FIG. 1 as viewed from front.

Also, as shown in FIG. 9, imagewise rays of light L2 carrying an image of the front fender 7 are projected onto the second mirror surface areas 29b (FIG. 7) as shown by a cross-hatched reflected area 39. This reflected area 39 is colored in the same color as that of the front fender 7, giving a silhouette of a lower edge of the lens member 23d and, accordingly, the reflected area 39 can be looked as if it were a part of the fairing 22 and, hence, a portion of the fairing 22 were to exist below the lamp unit 23, resulting in presentation of an appealing appearance.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A lamp unit adapted to be mounted above a front fender for a front wheel of a motorcycle, said lamp unit comprising:
   left and right head lamps;
   a single lens member positioned forwardly of and covering the left and right head lamps; and
   a mirror finished body positioned rearwardly of the lens member and including a first mirror surface area aligned with an intermediate portion of the lens member so as to extend up and down, and left and right second mirror surface areas continued from the first mirror surface area so as to extend in respective directions away from each other beneath the associated head lamps and along a lower edge of the lens member,
   wherein said first mirror surface area is so formed to operate, when viewed from front, to reflect an image of the front fender imagewise cast thereupon and each of said second mirror surface areas is so formed to operate, when viewed slantwise from front, to reflect an image of the front fender imagewise cast thereupon.

2. The lamp unit as claimed in claim 1, wherein the first and second mirror surface areas are formed integrally with each other.

3. The lamp unit as claimed in claim 2, further comprising:
   an extension covering accessories peripheral to the left and right head lamps for making up an area rearwardly of the lens member;
   left and right position lamps positioned at respective locations forwardly from and laterally inwardly between the head lamps; and
   a casing for accommodating the position lamps therein,
   wherein the extension is integrally formed with the first mirror surface area extending adjacently along an inner surface of the lens member, the second mirror surface extending adjacently along the lower edge of the inner surface of the lens member and the casing.

4. The lamp unit as claimed in claim 1, wherein
   the first mirror surface area extends upwardly from a vicinity of a lower edge portion of an inner surface of the lens member adjacently along the inner surface of the lens member; and
   the second mirror surface area extends adjacently along the lower edge portion of the inner surface of the lens member.

5. The lamp unit as claimed in claim 3, wherein
   an intermediate edge portion of the first mirror surface area extends to an area between the left and right position lamps and lateral thereof.

6. In a motorcycle comprising a front wheel, a front fender mounted on a front portion of the motorcycle so as to overhang the front wheel, a fairing mounted on the motorcycle for covering the front portion thereof and having an opening defined therein, said front fender and fairing being colored in a common color, and the lamp unit disposed above the front fender and exposed to outside through the opening in the fairing, the improvement being the lamp unit comprising:
   left and right head lamps;
   a single lens member positioned forwardly of and covering the left and right head lamps; and
   a mirror finished body positioned rearwardly of the lens member and including a first mirror surface area aligned with an intermediate portion of the lens member so as to extend up and down and left and right second mirror surface areas continued from the first mirror surface area so as to extend in respective directions away from each other beneath the associated head lamps and along a lower edge of the lens member,
   wherein said first mirror surface area is so formed to operate, when viewed from front, to reflect an image of the front fender imagewise cast thereupon and each of said second mirror surface areas is so formed to operate, when viewed slantwise from front, to reflect an image of the front fender colored in a common color with the fairing imagewise cast thereupon.

7. In the motorcycle as claimed in claim 6, wherein the fairing has a peripheral edge defining the opening, said peripheral edge having an upper intermediate edge portion protruding downwardly to a position near to an upper end of the first mirror surface area of the lamp unit.

8. The lamp unit as claimed in claim 6, the fairing is so formed that a lower edge portion of the lens member is exposed downwardly to outside.

9. The lamp unit as claimed in claim 7, wherein
   the upper immediate edge portion of the fairing confronts the upper end of the first mirror surface area in an area between the left and right position lamps.

10. In a motorcycle having a front fender, a fairing unit and a headlight unit, the improvement comprising:
    a headlight mounting assembly in the fairing unit above the front fender including a reflective surface portion positioned between the headlight unit and an upper surface of the front fender, the reflective surface is inclined relative to the front fender upper surface to project an image of the front fender to provide a reflection of a portion of the front fender upper surface on an intermediate portion of the headlight unit to appear as a continuance of the fairing unit beneath the headlight unit when viewed from the front of the motorcycle.

11. The motorcycle of claim 10 wherein the reflective surface portion extends across and to right and left lower sides of the headlight unit and right and left side of the reflective surface portion projects an image of the front fender to provide an appearance of the front fender upper surface as a continuance of the fairing unit on the lower sides of the headlight unit when viewed from the right and left sides of the headlight unit.

* * * * *